United States Patent [19]

Yamashita et al.

[11] Patent Number: 5,347,599
[45] Date of Patent: Sep. 13, 1994

[54] ADAPTIVE INTERPOLATION METHOD AND APPARATUS USING CORRELATION DETECTION

[75] Inventors: Haruo Yamashita, Osaka; Tsumoru Fukushima, Katano; Hideshi Ishihara, Takatsuki, all of Japan

[73] Assignee: Matsushita Electric Industrial Co., Ltd., Kadoma, Japan

[21] Appl. No.: 897,260

[22] Filed: Jun. 11, 1992

[30] Foreign Application Priority Data

Jun. 14, 1991 [JP] Japan .................. 3-142922
Dec. 2, 1991 [JP] Japan .................. 3-317819

[51] Int. Cl.$^5$ .............................. H04N 5/14
[52] U.S. Cl. ...................... 382/54; 348/448
[58] Field of Search .................. 382/47, 42, 54; 358/105, 140, 166, 451; 395/428; 340/728

[56] References Cited

U.S. PATENT DOCUMENTS 4,831,435  5/1989  Song et al. .................. 348/448
4,985,764  1/1991  Sato ........................... 358/140
5,019,903  5/1991  Dougall et al. ............... 358/140

FOREIGN PATENT DOCUMENTS 2-177683  3/1990  Japan .

OTHER PUBLICATIONS

S. Kogyo, *Photographic Industries*, vol. 47, No. 486, pp. 107–108 (Oct. 1989).

Primary Examiner—Stephen Chin
Assistant Examiner—Timothy J. May
Attorney, Agent, or Firm—Willian Brinks Hofer Gilson & Lione

[57] ABSTRACT

An interpolation apparatus for preventing image deterioration caused by correlation detection errors. The apparatus comprises a calculation means for obtaining the arithmetic mean of pixels on the scan lines above and below the line being interpolated, a correlation value detection means for obtaining the correlation value of the pixels, a setting means for outputting the reference value of correlation, a comparison means for outputting a binary signal set, a determination means for determining the interpolation line, and a selection means for selecting and passing the output of the calculation means.

12 Claims, 11 Drawing Sheets

ADAPTIVE INTERPOLATION METHOD AND APPARATUS USING CORRELATION DETECTION

BACKGROUND OF THE INVENTION

1. Field of the invention

The present invention relates to an interpolation method and apparatus used, for example, for generating a frame signal from a field signal in televisions, video recorders, printers, photocopiers, and similar devices that use gray or color scale images in the image and data processing fields.

2. Prior art

Pixel density conversion technologies have become increasingly important with the devilopment of digital imaging devices. In IDTV (improved definition TV) and EDTV (enhanced definition TV), a single frame is generated by interlacing two fields in the broadcast signal and video signal, and the method of non-interlaced reproduction of these frame becomes very important.

This non-interlaced reproduction of frames can be easily accomplished using the information from one previous field when there is a correlation between the frames as in still images. When there is no precise frame correlation as in a movirlg image, the information from the previous field is the information for a point in time 1/60th second earlier and cannot be used for direct field interlacing. It is therefore necessary to interpolate the data for one field between the scan lines to reproduce one complete frame.

The printer engine in video printers and other video signal hard copy printers likewise records images with the same number of pixels as in a complete frame. If the input video signal is a still image, the printer can print the image directly to paper, but if the signal is a moving image, the printer engine must interpolate the information for one field to obtain the same number of pixels as in the full frame before printing the image.

Linear interpolation using the average values of the pixels in the preceding and following scan lines has conventionally been used for field interpolation. Because this interpolation method generates additional pixel data from only a few pixels, the object has been to smooth the image by increasing the number of pixels rather than to improve the resolution. The interpolated image is therefore relatively defocused or blurred compared with the original source image.

Another interpolation method has since been developed to resolve these problems with linear interpolation by using statistical properties of the image, e.g. the continuity between fields in a moving image, to obtain a higher vertical resolution and to obtain diagonal lines that are smoother than in the linearly interpolated image by using correlation detection.

This interpolation method using correlation detection is explained in further below with reference to FIG. 12.

In FIG. 12 lines A and C are scan lines from the same field input continuously to the rasterizer. Line B is the scan line that is not input in this field and which must be interpolated. If the pixel to be interpolated is pixel Bn in line B where n is the pixel number, the differences ($\Delta 1$, $\Delta 2$, $\Delta 3$) in the three brightness levels passing through pixel Bn between lines A and C are expressed by the following equations.

$$\Delta 1 = |An - 1 - Cn + 1|$$

$$\Delta 2 = |An - Cn|$$

$$\Delta 3 = |An + 1 - Cn - 1|$$

The value to be used for the interpolated pixel Bn is selected by determining which of these differences is smallest, and then applying a corresponding equation. Thus, if min.$=\Delta 1$, $Bn = |An - 1 + Cn + 1|/2$ if min.$=\Delta 2$, $Bn = |An + Cn|/2$ if min.$=\Delta 3$, $Bn = |An + 1 + Cn - 1|/2$.

Thus, this interpolation method compares the level difference of the pixel An above and the pixel Cn below the interpolated pixel Bn with the level difference of the pixel An+1 right above and the pixel Cn−1 left below, and the level difference of the pixels An−1 left above and Cn+1 right below the interpolated pixel Bn. It is assumed that the continuity, i.e., correlation, between the images is highest in the direction in which the pixel level is lowest, and uses the average of the pixel values in this direction as the value of the interpolated pixel. (See *Shashin Kogyo* (Photography industry), Oct. 1989, pp. 107–108.) There is a related method that expands this concept to gray scale interpolation and expands the direction of interpolation to the right and left of these three directions (Japanese Patent Laid-Open No. H2-177683).

3. Problem to be solved with this conventional method, however, the correlation determining the interpolation direction is evaluated by comparing the absolute values of the pixel level differences in plural interpolation directions, specifically vertically, and right and left diagonally in the above method. The highest correlation between images is determined to be in the direction of the lowest level difference, and the pixel is interpolated in this direction. This results in the following problems.

If the pixel level difference is high in all interpolation directions it should be determined that there is no real correlation and linear interpolation should be applied. But if there is even a slight difference in the pixel levels, a correlation will be wrongly detected, the average of the pixels in this wrong interpolation direction will therefore be used as the interpolated value, and pixel noise and image deterioration will result.

Furthermore, if the pixel level difference is low in all directions and there is a correlation in all directions, it should be determined that there is a real correlation between the lines and linear interpolation should be applied. But if there is even a slight difference in the pixel levels, a correlation will again be wrongly detected, and pixel noise and image deterioration will result.

FIG. 13 is an example of an image in which interpolation noise will occur. The circles drawn with a solid line are input pixels, and the dotted line circles are interpolated pixels. Two vertical black lines are input one pixel apart, and pixel Bn is obtained by interpolation. The minimum pixel level difference is obtained in the three interpolation directions shown in the figure. The pixel level difference will be low in all three directions in this example, but if there is some slight variance for any reason and the level difference is lowest in either diagonal direction, that will be selected as the interpolation direction. Bn will therefore be interpolated as a black pixel, resulting in noise.

Furthermore, if the pixel level difference is equally small in both diagonal directions compared with the vertical pixel level difference, i.e., a contradiction exists in determining the correlation from the pixel level difference, it should be determined that there is no correlation and linear interpolation in the vertical direction should be applied. With the conventional method, however, one of these diagonal directions will be selected, again resulting in image deterioration.

In general, the correlation interpolation method smoothes diagonal lines in the image and improves vertical resolution if the correlation can be correctly detected using continuous elements in the image and the interpolation direction is correct, but noise and loss of image quality result if the correlation is not correctly detected. How the correlation is evaluated therefore becomes extremely important.

To obtain an image of quality equal to a full frame signal image from a field signal requires that even nearly horizontal diagonal lines be improved. This requires at least seven directions of interpolation. When the direction closest to the horizontal is used for interpolation, nearly horizontal diagonal lines can be improved, but when the interpolation is wrong, significant noise and loss of horizontal resolution result because the interpolated pixels are horizontally separated by six pixels. Thus, when the number of pixels used to determine the correlation is large, higher precision correlation detection is required the closer the interpolation direction is to the horizontal.

Furthermore, because the angles of the interpolation lines to the vertical in the conventional method are 45, 63.4, 71.6, and 76.0 degrees, the minimum interpolation angle is 45 degrees and there is high interpolation error near the vertical direction.

SUMMARY OF THE INVENTION

Therefore, an object of the present invention is to provide an interpolation apparatus that applies correlation detection, prevents image deterioration from correlation detection errors, and improves interpolation performance near the vertical and horizontal directions.

To achieve the above objective, a correlation detection interpolation apparatus according to the present invention comprises a calculation means for setting plural interpolation lines passing through the pixel to be interpolated at an angle of a maximum ±90 degrees to the vertical, obtaining the arithmetic mean of the pixel level of the two pixels above and below on the interpolation line, and obtaining the pixel level of the pixel to be interpolated, a correlation value detection means for obtaining the pixel level difference of the two pixels on the interpolation line and detecting the correlation value, a setting means for outputting a reference value used to determine whether the correlation indicated by the correlation value output by the correlation value detection means exists, a comparison means for comparing the magnitude of the correlation value output by the correlation value detection means with the reference value, and outputting a binary signal set showing the presence of a correlation in each direction, a determination means for determining the interpolation line using the output set of the comparison means, and a selection means for selecting and passing the output of the calculation means according to the output of the determination means.

The correlation detection interpolation method according to the present invention comprises a calculation means for setting plural interpolation lines passing through the pixel to be interpolated at an angle of a maximum ±90 degrees to the vertical, obtaining the arithmetic mean of the pixel level of the two pixels above and below on the interpolation line, and obtaining the pixel level of the pixel to be interpolated, a correlation value detection means for obtaining the pixel level difference of the two pixels on the interpolation line and detecting the correlation value, a setting means for outputting two reference values, a strong and a weak value, used to determine whether the correlation indicated by the correlation value output by the correlation value detection means exists, a comparison means for comparing the magnitude of the correlation value output by the correlation value detection means with the two reference values, and outputting a binary signal set showing the presence of a correlation in each direction, a determination means for determining the interpolation line using the output set of the comparison means, and a selection means for selecting and passing the output of the calculation means according to the output of the determination means. This method sets plural interpolation lines passing through the pixel to be interpolated at an angle of a maximum ±90 degrees to the vertical, sets, within the group of plural adjacent pixels on the scan lines above and below the pixel to be interpolated, a virtual pixel between adjacent pixels within the range of at least one pixel on each side of the pixels directly above and directly below the pixel to be interpolated, and defines the arithmetic mean of the pixel levels of the two adjacent pixels as the pixel level of the virtual pixel, and increments the angles of the interpolation lines near the vertical in smaller steps using the virtual pixel.

An alternative correlation detection interpolation method according to the present invention interpolates a pixel defined as B(0) using the seven pixels A(−3), A(−2), A(−1), A(0), A(+1), A(+2), A(+3) above and the seven pixels C(−3), C(−2), C(−1), C(0), C(+1), C(+2), C(+3) below where A(0) and C(0) are the pixels directly above and directly below pixel B(0), respectively, by grouping the pixel pairs A(−3) and C(3), A(−2) and C(2), A(−1) and C(1), A(0), A(1) and C(−1), A(2) and C(−2), and A(3) and C(−3) on the seven interpolation lines passing through pixel B(0) into a first region of the three interpolation lines A(−1) and C(1), A(0) and C(0), A(1) and C(−1), a second region of the three interpolation lines A(1) and C(−1), A(2) and C(−2), and A(3) and C(−3), and a third region of the three interpolation lines A(−3) and C(3), A(−2) and C(2), A(−1) and C(1).

In this method the interpolated value of the pixel B(0) is determined by applying a step for comparing the difference in the two pixel levels of each interpolation line in the first region with a predetermined reference value to detect the existence of a correlation, a step for similarly detecting the existence of a correlation in the three interpolation lines of the second region when there is a correlation in the left descending direction (A(1)→C(−1)) in the first region, and defining the arithmetic means of the two pixel levels as the value of B(0) for the correlationdetected interpolation lines, and defining the arithmetic mean of the pixel level in the direction A(1)→C(−1) as the value of B(0) when there is a contradiction in correlation detection, a step for similarly detecting the existence of a correlation in the three interpolation lines of the third region when there is a correlation in the right descending direction (A(−1)→C(1)) in the first region, and defining the arithmetic mean of the two pixel levels as the value of B(0) for the correlation-detected interpolation lines, and defining the arithmetic mean of the pixel level in the direction A(−1)→C(1) as the value of B(0) when there is a contradiction in correlation detection, and a step for defining the arithmetic mean of the pixel level in the direction A(0)→C(0) as the value of B(0) when any finding other than the above is detected in the first region.

An alternative correlation detection interpolation apparatus according to the present invention defines the pixel to be interpolated as B(0), uses the seven pixels A(−3), A(−2), A(−1), A(0), A(+1), A(+2), A(+3) above and the seven pixels C(−3), C(−2), C(−1), C(0), C(+1), C(+2), C(+3) below where A(0) and C(0) are the pixels directly above and directly below pixel B(0), respectively, groups the pixel pairs A(−3) and C(3), A(−2) and C(2), A(−1) and C(1), A(0) and C(0), A(1) and C(−1), A(2) and C(−2), and A(3) and C(−3) on the seven interpolation lines passing through pixel B(0) into a first region of the three interpolation lines A(−1) and C(1), A(0) and C(0), A(1) and C(−1), a second region of the three interpolation lines A(1) and C(−1), A(2) and C(−2), and A(3) and C(−3), and a third region of the three interpolation lines A(−3) and C(3), A(−2) and C(2), A(−1) and C(1). The interpolated value of the pixel B(0) is determined by means of a calculation means for obtaining the arithmetic mean of two pixel levels for each of the seven different interpolation lines to obtain the pixel level of the pixel to be interpolated B(0), a correlation value detection means for obtaining the pixel level difference of the two pixels on each of the seven interpolation lines and detecting the correlation value, a setting means for outputting a reference value used to determine whether the correlation indicated by the correlation value output by the correlation value detection means exists, a comparison means for comparing the magnitude of the correlation value output by the correlation value detection means with the reference value in each of the first, second, and third regions, and outputting a binary signal set showing the presence of a correlation in each direction for each region, a determination means for determining the interpolation direction using the output set of the comparison means, and a selection means for selecting and passing the output of the calculation means according to the output of the determination means.

The determination means in this embodiment comprises first, second, and third decoding circuits for decoding the binary signals for the first, second, and third regions and controlling the selection means. When the binary signal shows a correlation in the A(1)→C(−1) (left descending) interpolation line, the output of the second decoding circuit is given precedence over the output of the first decoding circuit. When the binary signal shows a correlation in the A(−1) →C(1) (right descending) interpolation line, the output of the third decoding circuit is given precedence over the output of the first decoding circuit. When the binary signal shows any relationship other than one of the above two, the output of the first decoding circuit is given precedence. The output of the selection means is determined by which of the first, second, and third decoding circuits has precedence.

In a further alternative of the above embodiment, the setting means outputs a strong/weak reference value, and the comparison means uses the weak reference value in the first region comparison, and the strong reference value in the second and third region comparisons.

OPERATION

The pixel level difference of the pixels of the scan lines above and below the line of the pixel to be interpolated is detected for each of the plural interpolation lines of different angles. The absolute value of the pixel level difference for each interpolation line is compared with the reference value output by the setting means and digitized. The determination means determines the best interpolation line from the combination of binary outputs for the plural interpolation lines, and the average value of the pixels on the scan lines above and below the interpolation pixel line obtained by the calculation means for the selected interpolation line is output as the interpolated value.

Alternatively, the absolute values are compared with the two strong/weak reference values and digitized, the best interpolation line is determined from the combination of binary outputs for the plural interpolation lines, and the average value of the pixels on the above and below scan lines obtained by the calculation means for the selected interpolation line is output as the interpolated value.

Furthermore, based on the correlation value from the correlation value detection means, the comparison means evaluates the existence of a correlation for each interpolation line in the first, second, and third regions. The determination means determines the direction of the interpolation line based on the correlation in the second region when there is a correlation in the left descending direction in the first region, determines the direction of the interpolation line based on the correlation in the third region when there is a correlation in the right descending direction in the first region, and determines the direction of the interpolation line based on the correlation in the first region when the correlation therein is neither of the previous two. The selection means selects and outputs the interpolated value from among the calculated value for each interpolation line input from the calculation means based on the output of the determination means.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
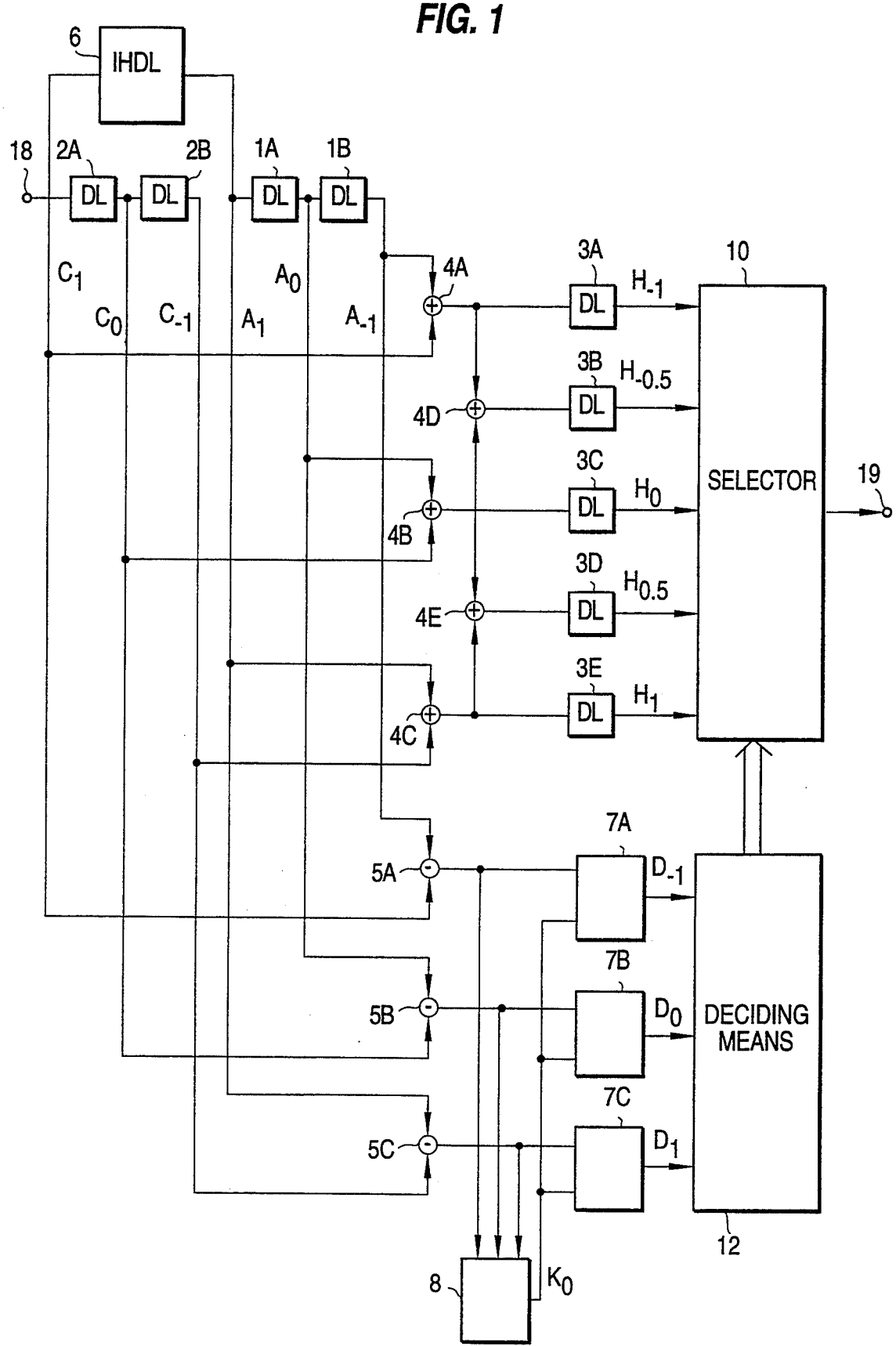
FIG. 1 is a block diagram of a correlation detection interpolation apparatus according to a first embodiment of the invention.

FIG. 1 is a block diagram of a first embodiment of a correlation detection interpolation apparatus according to the present invention. As shown in FIG. 1, this apparatus comprises horizontal delay means 1A, 1B, 2A, and 2B for introducing a one pixel delay to sequentially shift the pixel data on the scan lines (lines A and C) used for interpolation, and horizontal delay means 3A–3E to introduce a one pixel delay for adjustment to the position of the pixel to be interpolated.

The calculation means 4A–4C compute the arithmetic means of the pixels on lines A and C. The calculation means 4D computes the arithmetic mean of the outputs from calculation means 4A and 4B, and calculation means 4E computes the arithmetic mean of the outputs from calculation means 4B and 4C.

The substraction means 5A–5C subtract the level of the line C pixel from that of the line A pixel to compute the pixel level difference in each direction and detect the correlation value.

The vertical delay means 6 delays line A by one scan line period to adjust the timing so that line A is output simultaneously to line C.

The absolute value comparison means 7A–7C are binary conversion devices that compare the absolute value of the inputs from the subtraction means 5A–5C with a predetermined setting k0 and output a value of 1 if the absolute value is greater than the predetermined value, and a value of 0 if the absolute value is smaller.

The output of the subtraction means 5A–5C is input to the setting means 8. The setting means 8 determines the predetermined value k0 based on the input value, and outputs the result to the absolute value comparison means 7A–7C.

The determination means 12 determines the best interpolation line based on the binary signal set output by the absolute value comparison means 7A–7C, and the selection means 10 selects and outputs one of the plural inputs based on the selection signal.

Figure 4:
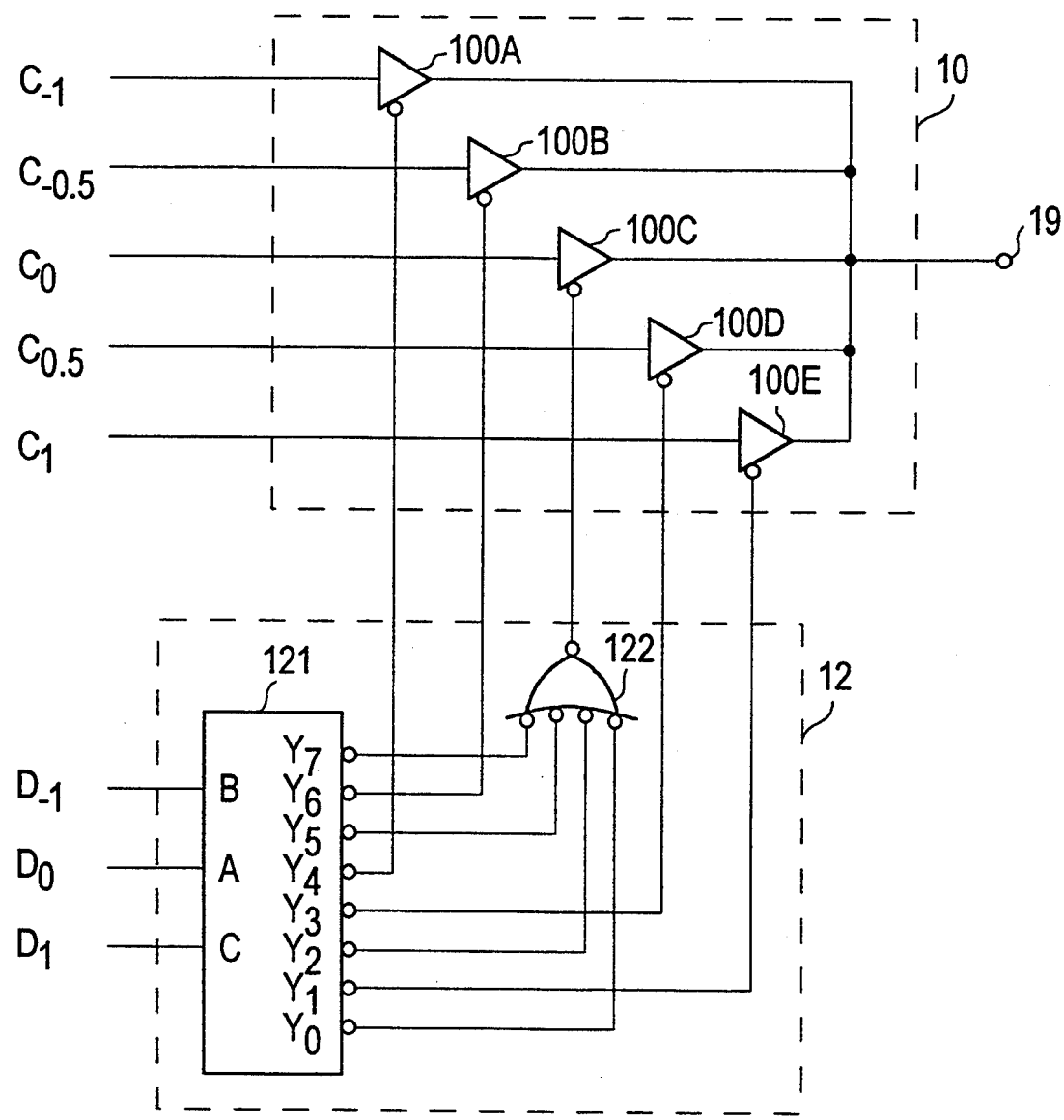
FIG. 4 is a detailed circuit diagram of the determination means and the selection means of the correlation detection interpolation apparatus according to the first embodiment.

FIG. 4 is a detailed circuit diagram of the determination means 12 and selection means 10 shown in FIG. 1.

The determination means 12 comprises a binary decoder 121 and a four input NOR gates 122. The binary decoder 121 is a 3-bit input, negative logic binary decoder 121 (74LS138) to which input C is the most-significant bit (MSB) and input A is the least-significant bit (LSB).

The selection means 10 comprises five analog switches 100A–100E, the outputs of which form a wired OR connection.

The binary decoder 121 and NOR gate 122 together form a determination means 12 with the decoding characteristics shown in Table 1. The selection means 10 is constructed using the five analog switches 100A–100E.

The operation of the correlation detection interpolation apparatus thus comprised is described below with reference to the accompanying figures.

Figure 2:
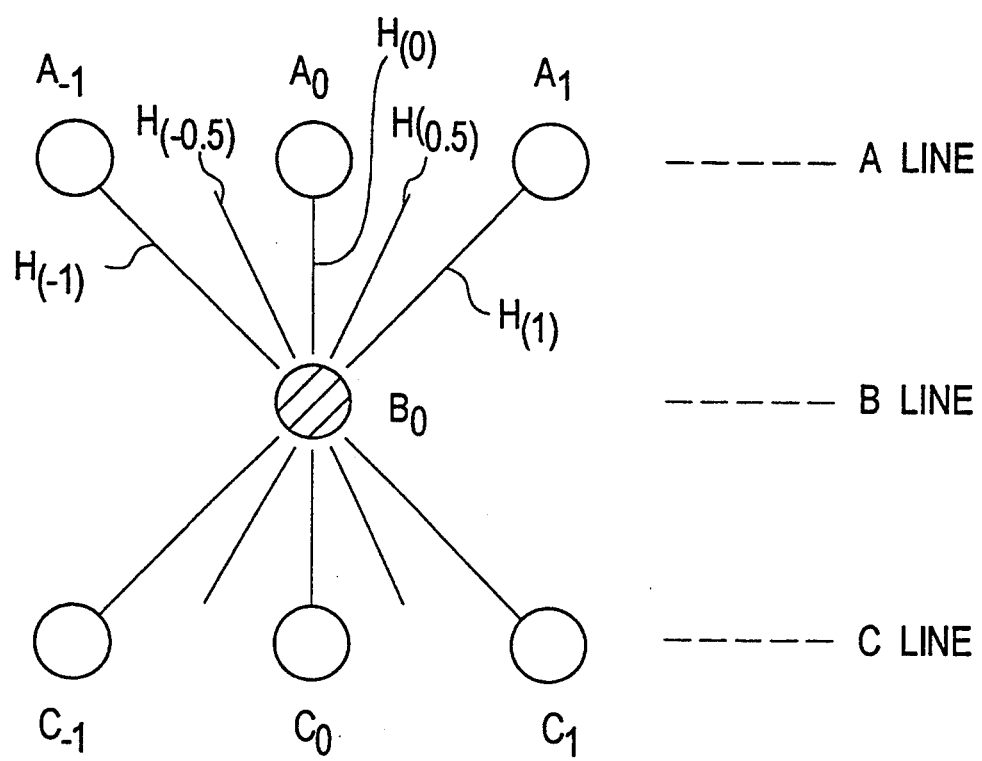
FIG. 2 is a conceptual diagram of the interpolation method used to describe the operation of the first embodiment.

FIG. 2 shows the relationship between input pixel data on lines A and C and the pixel data on the interpolated line B to illustrate the principle of the interpolation operation.

The image data input from the image input terminal 18 is converted by the horizontal delay means 2A and 2B to the data for the three pixels C(−1), C(0), and C(+1) on line C. The data for the three pixels A(−1), A(0), and A(+1) on line A is similarly converted by the vertical delay means 6 and the horizontal delay means 1A and 1B.

The interpolation method is described first.

The calculation means 4A computes the arithmetic mean for pixel A(−1) on line A and pixel C(1) on line C, and obtains the interpolation value H(−1) for the right descending, 45 degree interpolation direction in FIG. 2. Similarly, the calculation means 4B computes the interpolation value H(0) for the vertical interpolation direction, and calculation means 4C computes the interpolation value H(1) for the 45 degrees left descending interpolation direction. The calculation means 4D further computes the 26.6 degrees right descending interpolation value H(−0.5) by obtaining the arithmetic mean of the outputs from calculation means 4A and 4B, and calculation means 4E computes the 26.6 degrees left descending interpolation value H(0.5).

Which of these five interpolation values should be used is determined by the process described below, selected by the selection means 10, and output from the interpolation output terminal 19.

The operation applied for correlation detection is described next.

The subtraction means 5A obtains the difference of pixel A(−1) on line A and pixel C(1) on line C to compute the pixel level difference in the 45 degrees right descending direction. Similarly, the subtraction means 5B and 5C obtain the pixel level differences in the vertical and 45 degrees left descending directions.

The setting means 8 determines the reference value k0 used by the absolute value comparison means 7A–7C to evaluate the existence of a correlation in each of the interpolation directions, and in the present embodiment determines the reference value k0 according to the value of the subtraction means 5A–5C output. The reference value k0 is determined by obtaining the average of the three absolute values of the outputs from the subtraction means 5A–5C and setting the reference value k0 according to this average. Specifically, the reference value is set to one-half the arithmetic mean as a result of experiments with various different images.

The output of the subtraction means 5A–5C is converted to a positive value by the absolute value operation of the absolute value comparison means 7A–7C and compared with the reference value k0 output by the setting means 8, being converted in the process to a 1-bit binary value D(−1), D(0), or D(1) expressing whether the subtraction means 5A–5C value is less than (1) or greater than (0) the reference value k0.

Table 1 is the true logic table showing the characteristics of the determination means 12 according to the present embodiment.

TABLE 1

| D(−1) | D(0) | D(1) | −1 | −0.5 | 0 | 0.5 | 1 |
|---|---|---|---|---|---|---|---|
| 0 | 0 | 0 | 0 | 0 | 1 | 0 | 0 |
| 0 | 0 | 1 | 0 | 0 | 0 | 0 | 1 |
| 0 | 1 | 0 | 0 | 0 | 1 | 0 | 0 |
| 0 | 1 | 1 | 0 | 0 | 0 | 1 | 0 |
| 1 | 0 | 0 | 1 | 0 | 0 | 0 | 0 |
| 1 | 0 | 1 | 0 | 0 | 1 | 0 | 0 |
| 1 | 1 | 0 | 0 | 1 | 0 | 0 | 0 |
| 1 | 1 | 1 | 0 | 0 | 1 | 0 | 0 |

The first line in the table where the values (D(−1), D(0), D(1))=(0, 0, 0) indicates that the pixel level difference exceeds the predetermined reference value k0 in each of the three interpolation directions, and that there is therefore no significant correlation. Therefore to prevent noise, the vertical interpolation direction H(0) is selected and linear interpolation is applied.

Similarly, at (1, 1, 1), there is a correlation in all directions and no specific directional characteristic can be determined. The vertical interpolation direction H(0) is therefore selected again and linear interpolation is applied.

Because an interpolation line with a clear correlation can be determined when the values are (0, 0, 1), (0, 1, 0), and (1, 0, 0), the corresponding directions H(1), H(0), and H(−1) are selected.

When a correlation is confirmed in two directions (0, 1, 1) and (1, 1, 0), the true correlation can be determined to exist between these directions, and the values H(0.5) and H(−0.5) are selected as the interpolation direction.

Likewise, when a correlation is confirmed in two diagonal directions but not in the vertical direction and there is therefore a contradiction in the evaluation of correlation (1, 0, 1), there is assumed to be an error in the correlation detection and H(0) is selected as though there were no correlation.

Figure 3:
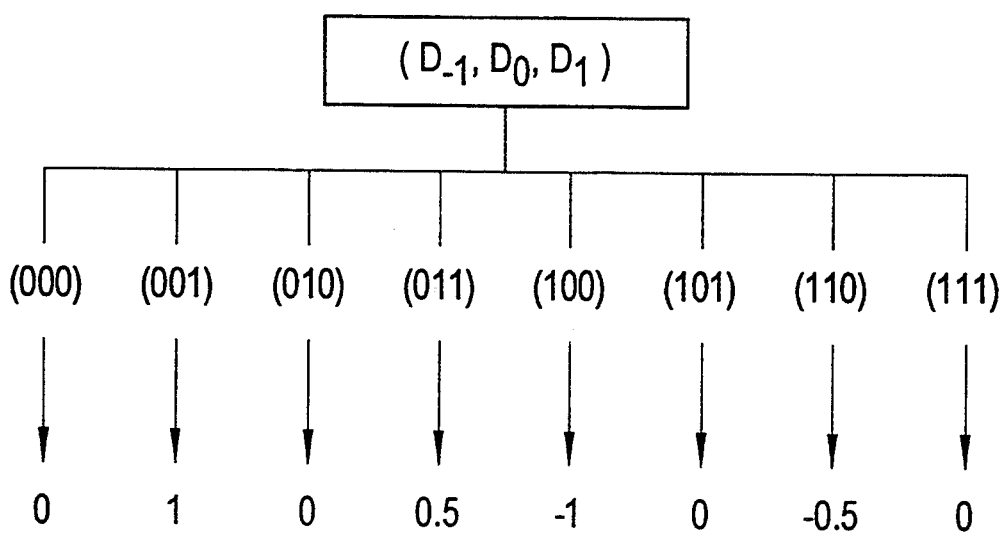
FIG. 3 is a chart used to describe the correlation detection operation of the first embodiment.

FIG. 3 is a map of the characteristics shown in Table 1, and shows the direction of the interpolation line output according to the combination of the values D(−1), D(0), and D(1).

The binary decoder 91 binary decodes the 3-bit input, and separates the obtained states by case according to Table 1. For example, if the input is (1,0,0), the buffer gate 100A becomes active, and interpolated signal C(−1) is output to the interpolation output terminal 19. If the case is a vertical correlation (0,1,0), no correlation (0,0,0), correlation in all directions (1,1,1), or a contradictory correlation (1,0,1), buffer gate 100C is activated using the negative logic OR gate 92, and the interpolated signal C(0) is output to the interpolation output terminal 19.

To summarize, data for six pixels on the scan lines above and below the pixel to be interpolated is used to detect the pixel level difference for interpolation lines in three directions intersecting the interpolation pixel. These pixel level differences are compared with a dynamically generated reference value k0 and the result is binarized. The best interpolation line is determined from among five interpolation directions using the combinations of binary outputs to the interpolation lines in three directions, and linear interpolation is applied in that direction.

Thus, the present invention offers the following benefits when compared with the conventional method whereby the pixel level differences in each direction are compared with each other because correlation detection is based on the reference value k0.

1. Detection errors can be prevented because an accurate evaluation of the correlation direction, of no correlation, and of correlations in all directions is possible.

2. Detection errors can be prevented because contradictions in the correlation can be detected.

3. Correlations can be evaluated in five directions, and interpolation performance at angles less than 45 degrees to the vertical is improved.

Therefore, diagonal lines in an image can be smoothed, and the vertical resolution can be improved for pixels interpolated in a diagonal direction due to a diagonal correlation.

Second embodiment

Figure 5:
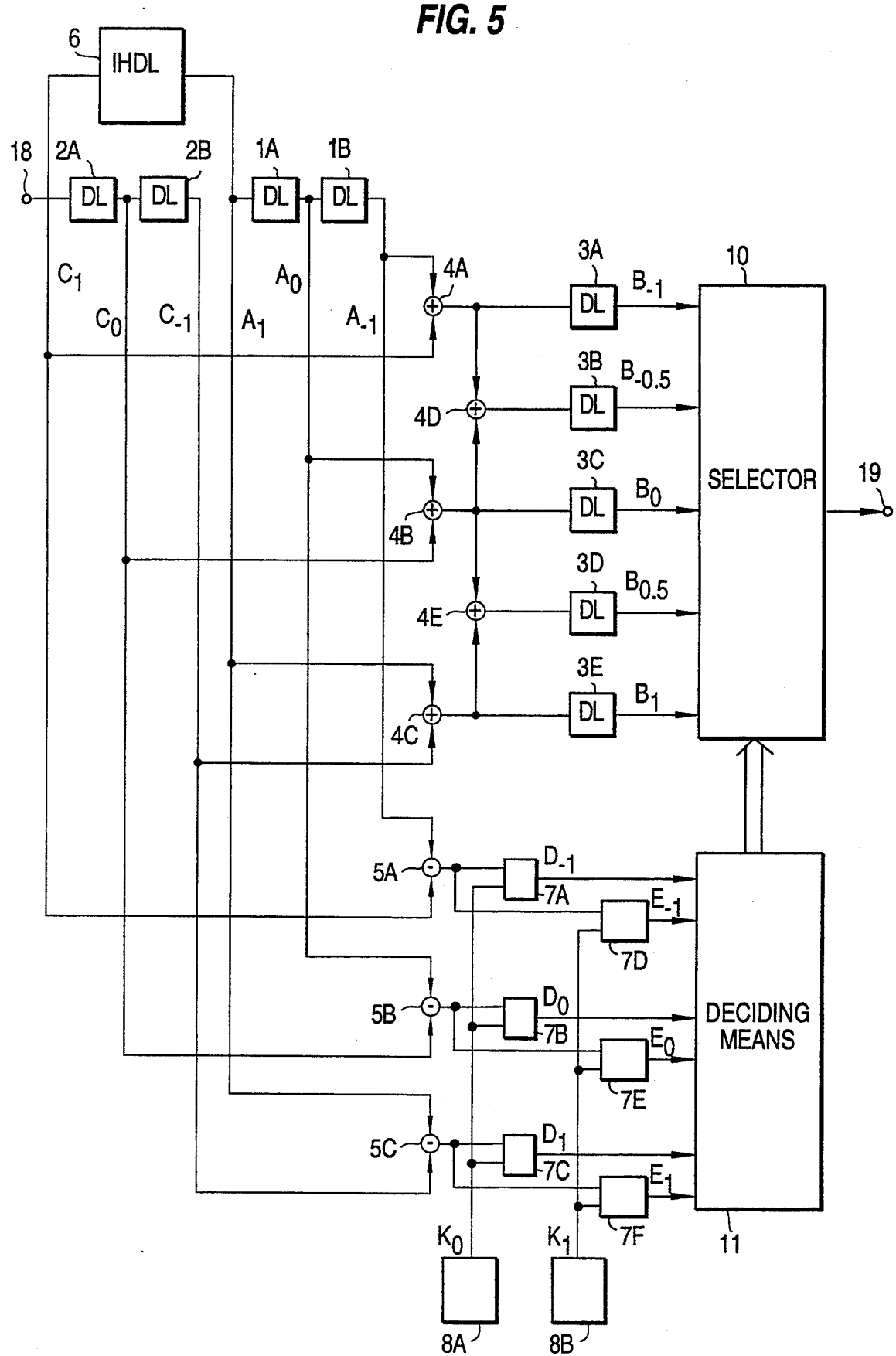
FIG. 5 is a block diagram of a correlation detection interpolation apparatus according to a second embodiment of the invention.

An alternative embodiment of the present invention is described hereinbelow with reference to the accompanying figures. As shown in FIG. 5, this apparatus comprises horizontal delay means 1A, 1B, 2A, and 2B for introducing a one pixel delay to sequentially shift the pixel data on the scan lines (lines A and C) used for interpolation, and horizontal delay means 3A–3E to introduce a one pixel delay for adjustment to the position of the pixel to be interpolated.

The calculation means 4A–4C compute the arithmetic means of the pixels on lines A and C. The calculation means 4D computes the arithmetic mean of the outputs from calculation means 4A and 4B, and calculation means 4E computes the arithmetic mean of the outputs from calculation means 4B and 4C.

The subtraction means 5A–5C subtract the level of the line C pixel from that of the line A pixel to compute the pixel level difference in each direction and detect the correlation value.

The vertical delay means 6 delays line A by one scan line period to adjust the timing so that line A is output simultaneously to line C.

The absolute value comparison means 7A–7C are binary conversion devices that compare the absolute value of the inputs from the subtraction means 5A–5C with a predetermined setting k0 and output a value of 1 if the absolute value is greater than the predetermined value, and a value of 0 if the absolute value is smaller. Similarly, absolute value comparison means 7D–7F compare the absolute value of the inputs from the subtraction means 5A–5C with a predetermined setting k1.

The setting means 8A and 8B determine the predetermined values k0 and k1, and output the results to the absolute value comparison means 7A–7C and 7D–7F, respectively.

The determination means 11 determines the best interpolation line based on the binary signal set output by the absolute value comparison means 7A–7C and 7D–7F, and the selection means 10 selects and outputs one of the plural inputs based on the selection signal.

The operation of the correlation detection interpolation apparatus thus comprised is described below with reference to the accompanying figures.

The following description concerns primarily the correlation detection operation of the present embodiment because the interpolation operation is the same as that of the first embodiment.

The subtraction means 5A obtains the difference of pixel A(−1) on line A and pixel C(1) on line C to compute the pixel level difference in the 45 degrees right descending direction. Similarly, the subtraction means 5B and 5C obtain the pixel level differences in the vertical and 45 degrees left descending directions.

The output of the subtraction means 5A–5C is converted to a positive value by the absolute value operation of the absolute value comparison means 7A–7C and 7D–7F, and compared with the reference values k0 and k1 output by the setting means 8A and 8B. In the process the values are converted to 1-bit binary values D(−1), D(0), and D(1) and E(−1), E(0), and E(1) expressing whether the subtraction means 5A–5C value is less than (1) or greater than (0) the reference values k0 and k1.

Figure 6:
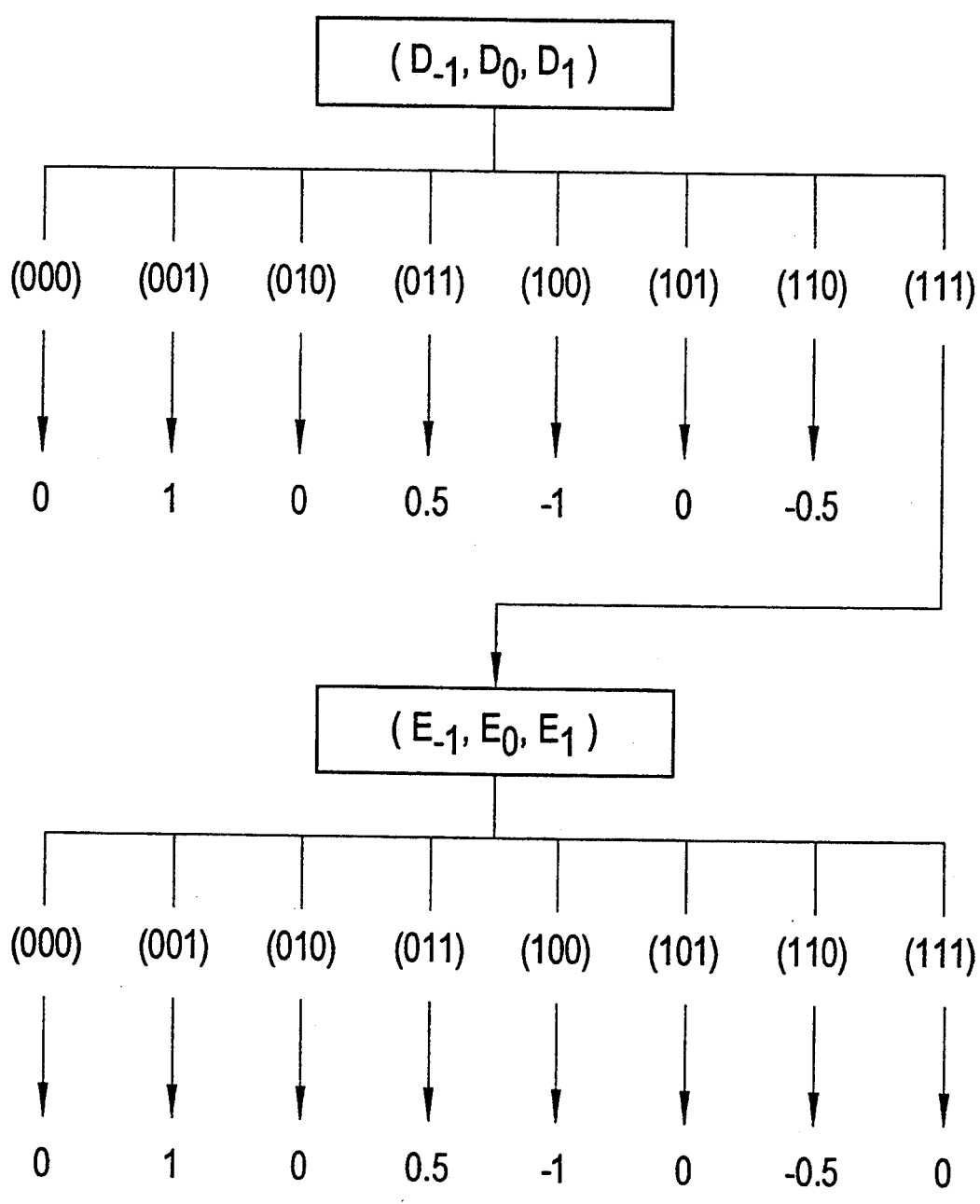
FIG. 6 is a chart used to describe the correlation detection operation of the second embodiment of the invention.

FIG. 6 is a chart of the case separation of the interpolation direction lines output according to the combination of the values D(−1), D(0), D(1) and E(−1), E(0), E(1) obtained with the two reference values.

The first evaluation is the same as that described in the first embodiment above.

The first line in the table where the values (D(−1), D(0), D(1))=(0, 0, 0) indicates that the pixel level difference exceeds the predetermined reference value k0 in each of the three interpolation directions, and that there is therefore no significant correlation. Therefore to prevent noise, the vertical interpolation direction H(0) is selected and linear interpolation is applied.

Because an interpolation line with a clear correlation can be determined when the values are (0, 0, 1), (0, 1, 0), and (1, 0, 0), the corresponding directions H(1), H(0), and H(−1) are selected.

When a correlation is confirmed in two directions (0, 1, 1) and (1, 1, 0), the true correlation can be determined to exist between these directions, and the values H(0.5) and H(−0.5) are selected as the interpolation direction.

Likewise, when a correlation is confirmed in two diagonal directions but not in the vertical direction and there is therefore a contradiction in the evaluation of correlation (1, 0, 1), there is assumed to be an error in the correlation detection and H(0) is selected as though there were no correlation.

In the previous embodiment the vertical interpolation direction H(0) is selected and linear interpolation is again applied at (1, 1, 1) because there is a correlation in all directions and no specific directional characteristic can be determined. In the present embodiment, however, this case causes the absolute value comparison means 7D–7F to look for a correlation using a second predetermined reference value k1 to look for a significant correlation when there is a correlation in all directions (1, 1, 1) resulting from the first correlation detection operation. The binary data pairs (E(−1), E(0), E(1)) output by these absolute value comparison means 7D–7F are then similarly separated into cases to determine the interpolation direction.

When the relationship between the second reference value k1 and the first reference value k0 is k1<k0, the data pairs (E(−1), E(0), E(1)) are again separated into eight cases because the determination of a correlation with reference value k1 is more difficult.

An interpolation line with a clear correlation can be determined when the values are (0, 0, 1), (0, 1, 0), and (1, 0, 0), and the corresponding directions H(1), H(0), and H(−1) are therefore selected.

When a correlation is confirmed in two directions (0, 1, 1) and (1, 1, 0), the true correlation can be determined to exist between these directions, and the values H(0.5) and H(−0.5) are selected as the interpolation direction.

Likewise, when a correlation is confirmed in two diagonal directions but not in the vertical direction and there is therefore a contradiction in the evaluation of correlation (1, 0, 1), there is assumed to be an error in the correlation detection and H(0) is selected as though there were no correlation.

Furthermore, at (1, 1, 1), there is a correlation in all directions and no specific directional characteristic can be determined. The vertical interpolation direction H(0) is therefore selected again.

In a high contrast binary image such as text and charts, there is a wide difference in the levels of the pixels around the pixel to be interpolated. Thus, when the pixel levels are expressed on a 256-step scale, no correlation will be detected unless correlations are detected using a relatively loose threshold value of approximately 64.

In images with continuous tones such as in a photograph of natural scenery, a much lower threshold value of k0<=16 is required for accurate correlation detection.

In practice, however, many images are a combination of these two types of images or somewhere in between these two types.

Thus, the present embodiment uses a rough threshold value (k0) in the first correlation detection step to detect correlations in the high contrast parts of the image, and assumes that there is a correlation in all directions in most parts of the image where there are continuous tones. In the second correlation detection step, therefore, correlation detection is applied using a more restrictive threshold value to those parts determined to have a correlation in all directions in the first step to enable effective correlation detection for all parts of the image.

Figure 7:
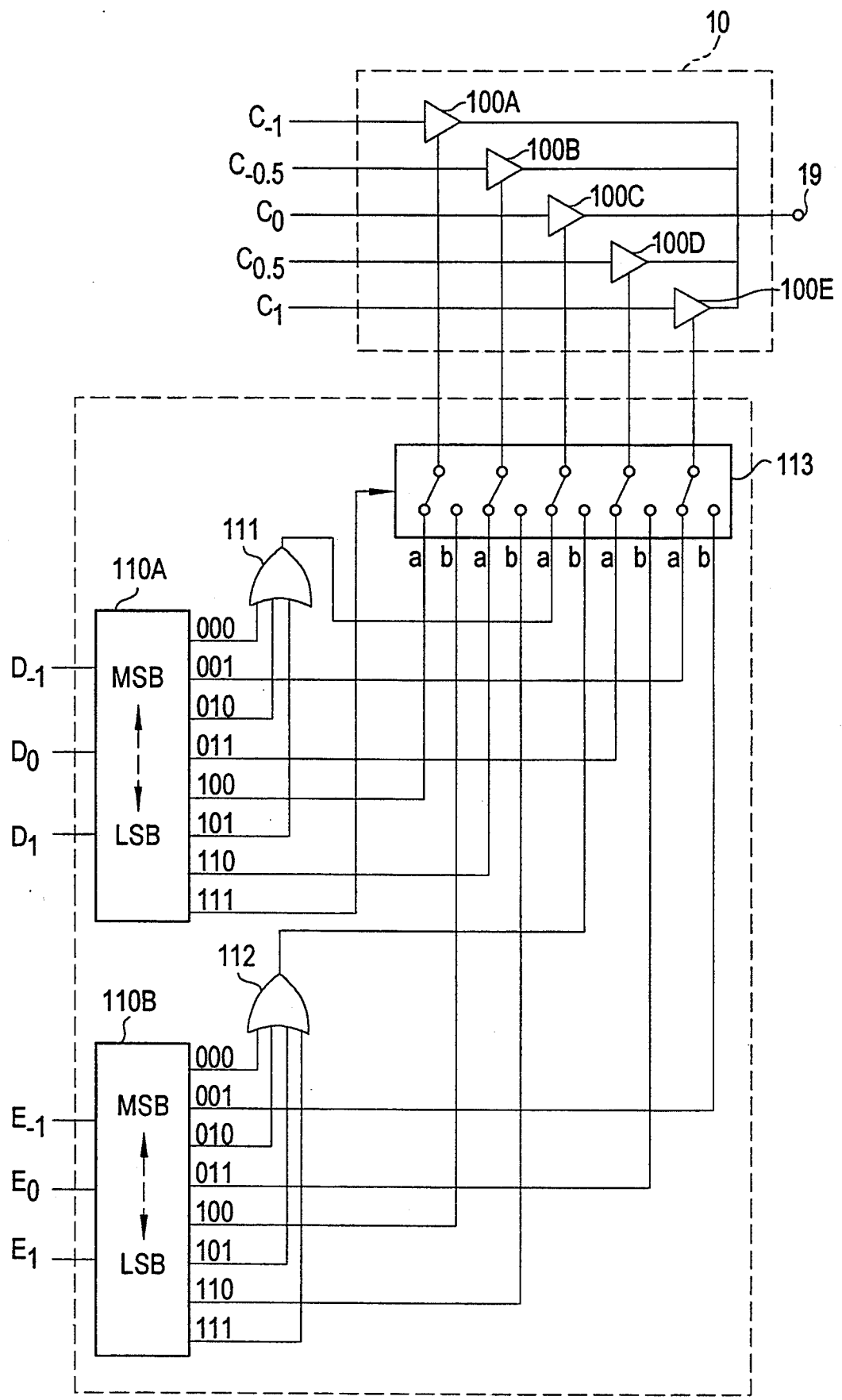
FIG. 7 is a detailed circuit diagram of the determination means and the selection means of the correlation detection interpolation apparatus according to the second embodiment of the invention.

FIG. 7 is a detailed circuit diagram of the determination means 11 and selection means 10 shown in FIG. 5 to achieve the characteristics described using FIG. 6.

The determination means 11 comprises two binary decoders 110A and 110B, two OR gates 111 and 112, and an 8-input, 4-output multiplexer 113. The binary decoders 110A and 110B are 3-bit input binary decoders. The eight outputs become active when the 3-bit combination of values indicated to the right of the symbols (D and E) for the inputs correspond to the values indicated for the outputs.

The selection means 10 comprises five analog switches 100A–100E, the outputs of which form a wired OR connection.

The multiplexer 113 comprises four units which select and output one of the inputs a or b. Input a is selected when the selector signal input from the left in the figure is not active, and input b is selected when it is active.

The binary decoder 110A performs binary decoding of the binary data pairs (D(−1), D(0), D(1)) using a relatively high reference value k0, and the binary decoder 110B performs binary decoding of the binary data pairs (E(−1), E(0), E(1)) using a relatively low reference value k1. Thus when the decoded output (1,1,1) for the binary decoder 110A is active, the inputs to the multiplexer 113 connected to the decoded output (1,1,1) are switched to input b.

Therefore, when the decoded output (1,1,1) for the binary decoder 110A is not active, the outputs of the binary decoder 110A and the OR gate 111 are input to the selection means 10, and the interpolation value for the corresponding interpolation line is output from the image output terminal 19. When the decoded output (1,1,1) for the binary decoder 110A is active, the interpolation direction determined by the binary decoder 110B and the OR gate 112 is applied to the selection means 10, and the interpolation value for the corresponding interpolation line is output from the image output terminal 19.

For example, when (D(−1), D(0), D(1)) is (1,0,0), the binary decoder 110A output (1,0,0) is active and the output (1,1,1) is not active. The output (1,0,0) is therefore output through the multiplexer 113, activating the analog switch 100A and the interpolated signal C(−1) is output to the interpolation output terminal 19.

When the binary decoder 110A output is (1,1,1) because this rough first step correlation detection process determines a correlation in all directions and cannot determine a single specific correlation with (D(−1), D(0), D(1)), the multiplexer 113 is caused to select input terminals b to select the interpolation direction using the more restrictive correlation detection enabled with (E(−1), E(0), E(1)).

To summarize, data for six pixels on the scan lines above and below the pixel to be interpolated is used to detect the pixel level difference for interpolation lines in three directions intersecting the interpolation pixel. These pixel level differences are compared with a rough reference value k0 and the result is binarized. The best interpolation line is determined from among five interpolation directions using the combinations of binary outputs to the interpolation lines in three directions, and linear interpolation is applied in that direction. However, because a significant directional characteristic cannot be determined when a correlation is determined in all three directions using this rough reference value k0, the absolute value of the pixel level differences for these three directions is binarized using a more restrictive reference value k1, the best interpolation line is determined from among five interpolation directions using the combinations of binary outputs to the interpolation lines in three directions, and linear interpolation is applied in that direction.

The present embodiment effectively applies loose correlation detection with a high threshold value to high contrast binary images such as text and charts, and effectively detects the interpolation direction through a more restrictive correlation detection process using a low threshold value for images with continuous tone areas such as a pictures of natural scenery, and can therefore effectively detect correlations in all images.

In addition to the benefits of the first embodiment, the present embodiment can actively determine the interpolation direction in images using two high/low reference values. Thus, the present embodiment offers the same improvement in detection error reduction as the first embodiment while further improving correlation interpolation. It can therefore smoothly interpolate diagonal edges in more images, and can improve the vertical resolution of pixels interpolated in a diagonal direction due to a diagonal correlation.

It is to be noted that the above embodiments were described using three pixels on the above and below scan lines and five interpolation directions, but these may be increased to five pixels each or seven pixels each and the number of interpolation directions increased. In addition, the interpolation direction passing between the pixels may be omitted, and the number of pixels on the above and below scan lines and the interpolation directions matched.

Furthermore, the reference values k0 and k1 are constants in this embodiment, but they may also be varied according to the pixel level difference in three directions as in the first embodiment. In this case the arithmetic mean of the absolute value of the pixel level difference in three directions may be defined as k0, and one-fourth of the arithmetic mean as reference value k1.

Furthermore, by defining k1>k0 in the second embodiment, the order of separation for binary images and natural images by case may be reversed, and the case (D(−1), D(0), D(1))=(0,0,0) may be further separated into other cases using the value k1 to achieve the same result.

Third embodiment

Figure 8:
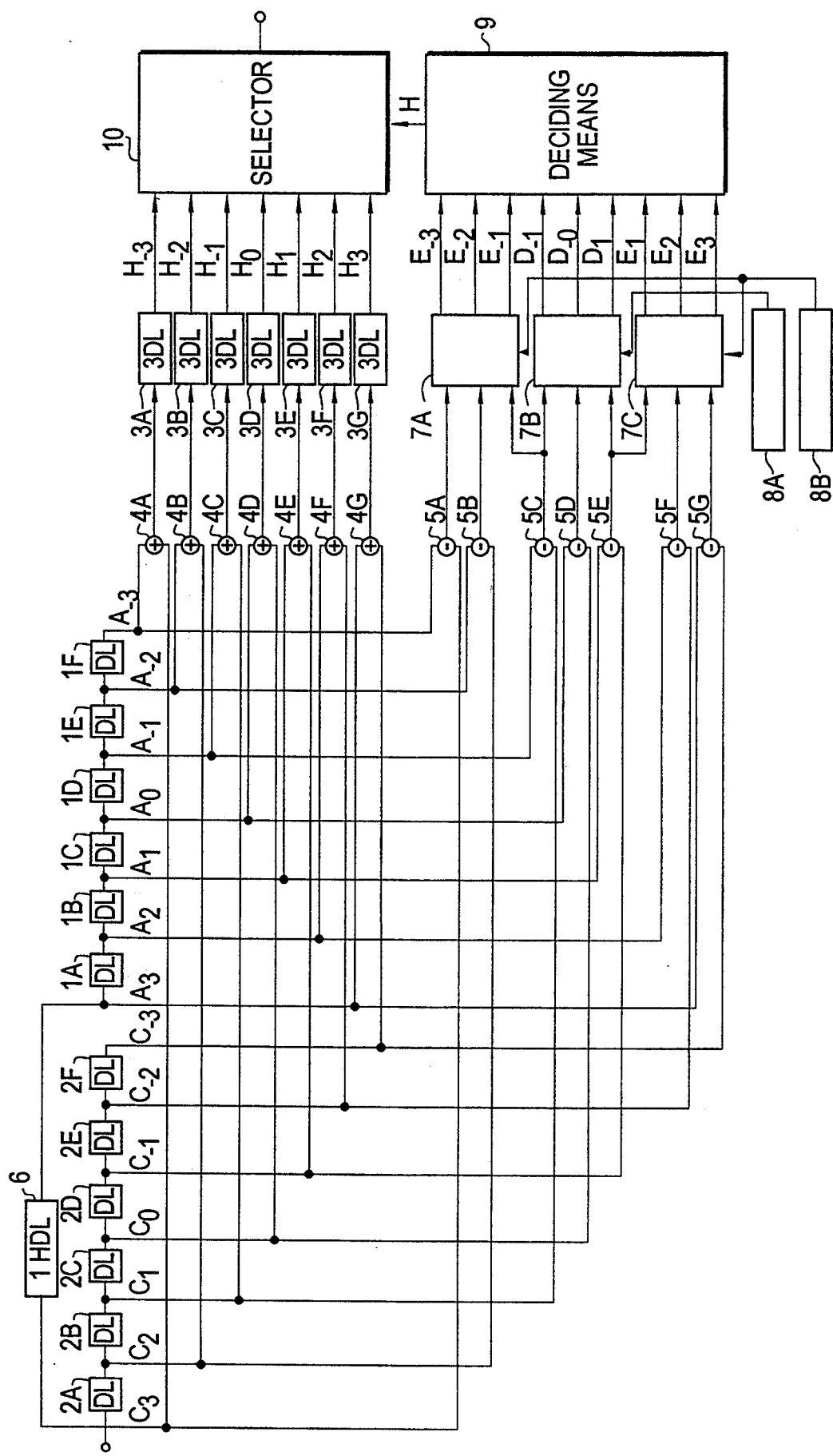
FIG. 8 is a block diagram of a correlation detection interpolation apparatus according to a third embodiment of the invention.

FIG. 8 is a block diagram of a third embodiment of a correlation detection interpolation apparatus according to the present invention. As shown in FIG. 8, this apparatus comprises horizontal delay means 1A–1F for introducing a one pixel delay to sequentially shift the pixel data on the scan line (line A) above the line of the pixel to be interpolated. Horizontal delay means 2A–2F introduce a one pixel delay to sequentially shift the pixel data on the scan line (line C) below the line of the pixel to be interpolated. Horizontal delay means 3A–3G introduce a three pixel delay for adjustment to the position of the pixel to be interpolated.

The calculation means 4A–4G compute the arithmetic mean of the pixels on lines A and C.

The subtraction means 5A–5G subtract the level of the line C pixel from that of the line A pixel to compute the pixel level difference in each direction and detect the correlation value.

The vertical delay means 6 delays line A by one scan line period to adjust the timing so that line A is output simultaneously to line C.

The absolute value comparison means 7A and 7C are binary conversion devices that compare the absolute value of the inputs from the subtraction means 5A–5C and 5E–5G, respectively, with a predetermined setting k1 and output a value of 1 if the absolute value is greater than the predetermined value, and a value of 0 if the absolute value is smaller. The absolute value comparison means 7B compares the absolute value of the inputs from the subtraction means 5C–5E with a predetermined setting k0, and outputs a value of 1 if the absolute value is greater than the predetermined value, and a value of 0 if the absolute value is smaller.

The setting means 8A determines the predetermined value k0, and outputs the result to the absolute value comparison means 7B.

The setting means 8B determines the predetermined value k1, and outputs the result to the absolute value comparison means 7A and 7C.

The determination means 9 determines the best interpolation line based on the binary signal set, and the selection means 10 selects and outputs one of the plural inputs based on the selection signal.

The determination means 9 comprises three 3-bit binary decoders 91, 92, and 93, OR gates 94A–94E, and two-input AND gates 95A–95F.

The eight outputs of the binary decoders 91, 92, and 93 becomes active when the 3-bit combination of values indicated to the right of the symbols (D and E) for the inputs correspond to the values indicated for the outputs.

The OR gates 94A, 94B, 94C, 94D, and 94E have 6, 4, 3, 3, and 4 inputs, respectively.

The selection means 10 comprises seven analog switches 100A–100G, the outputs of which form a wired OR connection.

The AND gates 95A–95C apply the evaluation result returned by the decoder 93 and the OR gates 94D and 94E to the selection means 10 only when the binary decoder 91 outputs (1,0,0). AND gates 95D–95F apply the evaluation result returned by the decoder 92 and the OR gates 94B and 94C to the selection means 10 only when the binary decoder 91 outputs (0,0,1). When the decoder outputs any other value, the evaluation result returned by the decoder 91 and the OR gates 94A is applied to the selection means 10. The output of the determination means 9 is applied to the corresponding analog switch 100A–100G in the selection means 10, and the interpolation value for the corresponding interpolation line is output from the interpolation output terminal.

The operation of the correlation detection interpolation apparatus thus comprised is described below with reference to the accompanying figures.

The image data input from the image input terminal in FIG. 8 is converted by the horizontal delay means 2A–2F to the seven pixel data series $C(-3)$, $C(-2)$, $C(-1)$, $C(0)$, $C(+1)$, $C(+2)$, $C(+3)$ on line C. The data for the seven pixels $A(-3)$, $A(-2)$, $A(-1)$, $A(0)$, $A(+1)$, $A(+2)$, $A(+3)$ on line A is similarly converted by the vertical delay means 6 and the horizontal delay means 1A–1F.

Figure 9:
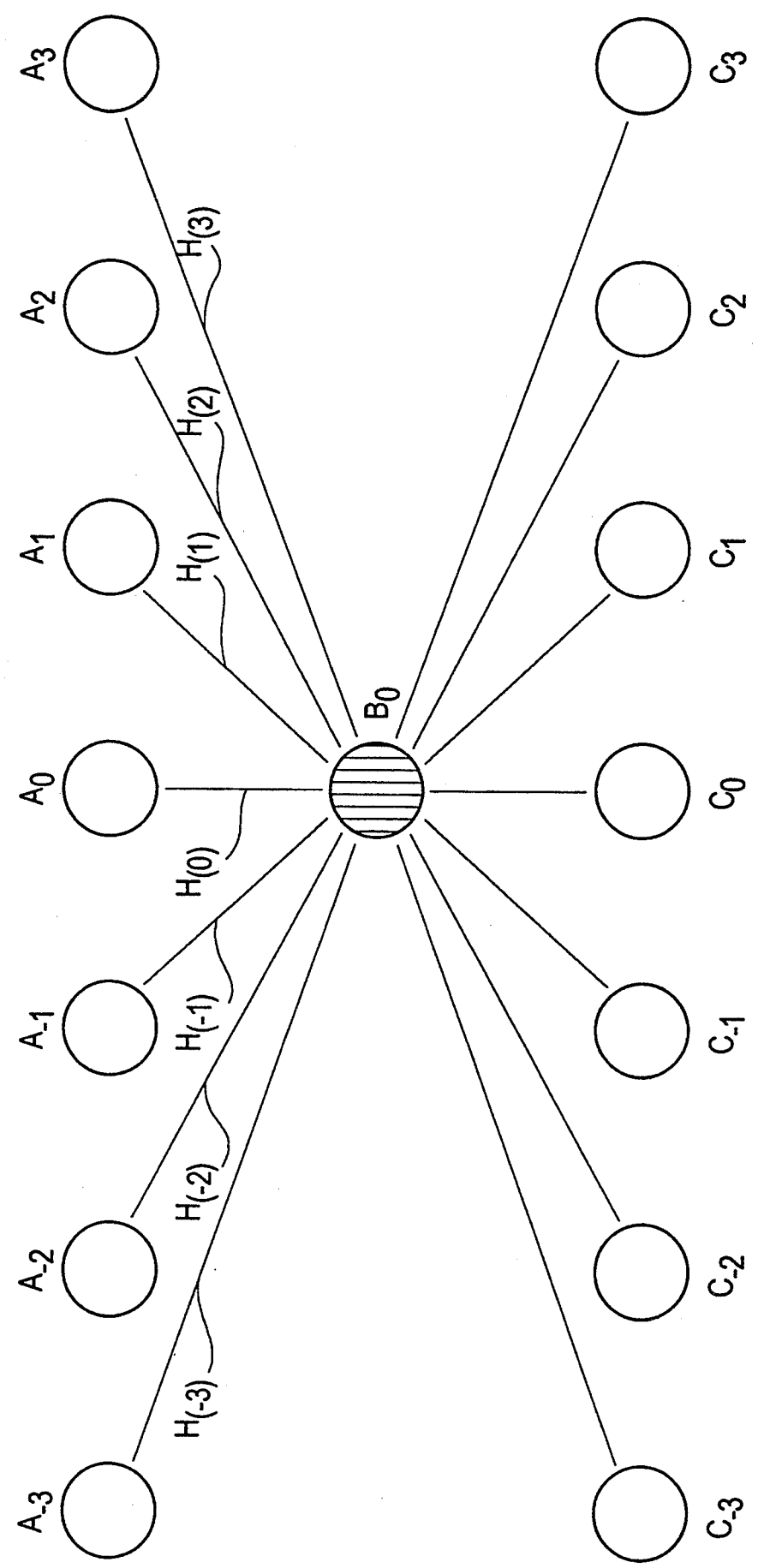
FIG. 9 is a conceptual diagram showing the positions of the pixel data and the pixel information on the input lines A and C relative to the pixel to be interpolated B(0), the seven interpolation lines and interpolation values (H in the figure)

FIG. 9 shows the positions of the pixel data and the pixel information on the input lines A and C (indicated as A and C in the figure) relative to the pixel to be interpolated $B(0)$ (indicated as B in the figure). The seven interpolation lines and values (H in the figure) are shown to illustrate the interpolation operation of this embodiment.

The pixel data on lines A and C is input to the calculation means 4A–4G in FIG. 8. The calculation means 4A–4G compute the arithmetic mean of the pixels on each of the seven interpolation lines passing through the pixel to be interpolated $B(0)$ to obtain the interpolation value for each line. Calculation means 4A, 4B, and 4C compute the interpolation values $H(-3)$, $H(-2)$, and $H(-1)$, respectively, for the 18 degrees, 27 degrees and 45 degrees right descending interpolation lines in FIG. 9. The calculation means 4D computes the interpolation value $H(0)$ for the vertical interpolation direction. Calculation means 4E, 4F, and 4G compute the interpolation values $H(3)$, $H(2)$, and $H(1)$, respectively, for the 18 degrees, 27 degrees and 45 degrees right descending interpolation lines in FIG. 9.

These interpolation values are then input to the determination means 9. Which of these seven interpolation values should be used is determined by the process described below, selected by the selection means 9, and output from the image output terminal.

The pixel data on lines A and C is input to the subtraction means 5A–5G in FIG. 8. The subtraction means 5A–5G obtain the difference of the pixels on lines A and C to compute the pixel level difference for each of the seven interpolation lines. Subtraction means 5A, 5B and 5C obtain the pixel level differences for the 18 degrees, 27 degrees and 45 degrees right descending interpolation lines in FIG. 9. Subtraction means 5D computes the pixel level difference for the vertical interpolation line. Subtraction means 5E, 5F and 5G obtain the pixel level differences for the 18 degrees, 27 degrees and 45 degrees left descending interpolation lines. The seven pixel level differences are divided into three groups 5A–5C, 5C–5E, and 5E–5G, which are respectively input to the absolute value comparison means 7A–7C.

The output of the subtraction means 5C–5E is converted to a positive value by the absolute value operation of the absolute value comparison means 7B and compared with the reference value k0 output by the setting means 8A, being converted in the process to a 1-bit binary value $D(-1)$, $D(0)$, or $D(1)$ expressing whether the difference is less than (1) or greater than (0) the reference value k0. This binary signal ($D(-1)$, $D(0)$, $D(1)$) states whether there is a correlation between the three interpolation lines of six pixels at the middle of FIG. 9.

The output of the subtraction means 5A–5C is converted to a positive value by the absolute value operation of the absolute value comparison means 7B and compared with the reference value k1 (where $k1 < k0$) output by the setting means 8B, being similarly converted in the process to a 1-bit binary value $E(-3)$, $E(-2)$, or $E(-1)$. This binary signal ($E(-3)$, $E(-2)$, $E(-1)$) states whether there is a correlation between the three interpolation lines for the six pixels $A(-3)$, $A(-2)$, $A(-1)$, $C(1)$, $C(2)$, $C(3)$ in FIG. 9.

The output of the subtraction means 5E–5G is converted to a positive value by the absolute value operation of the absolute value comparison means 7C and compared with the reference value k1 output by the setting means 8B, being similarly converted in the process to the binary signal $E(1)$, $E(2)$, or $E(3)$. This binary signal ($E(1)$, $E(2)$, $E(3)$) states whether there is a correlation between the three interpolation lines for the six pixels $A(3)$, $A(2)$, $A(1)$, $C(-3)$, $C(-2)$, $C(-1)$ in FIG. 9.

The determination means 9 determines which of the interpolation values $H(-3)$–$H(3)$ is best based on the binary signal sets ($D(-1)$, $D(0)$, $D(1)$), ($E(1)$, $E(2)$, $E(3)$), and ($E(-3)$, $E(-2)$, $E(-1)$).

Figure 10:
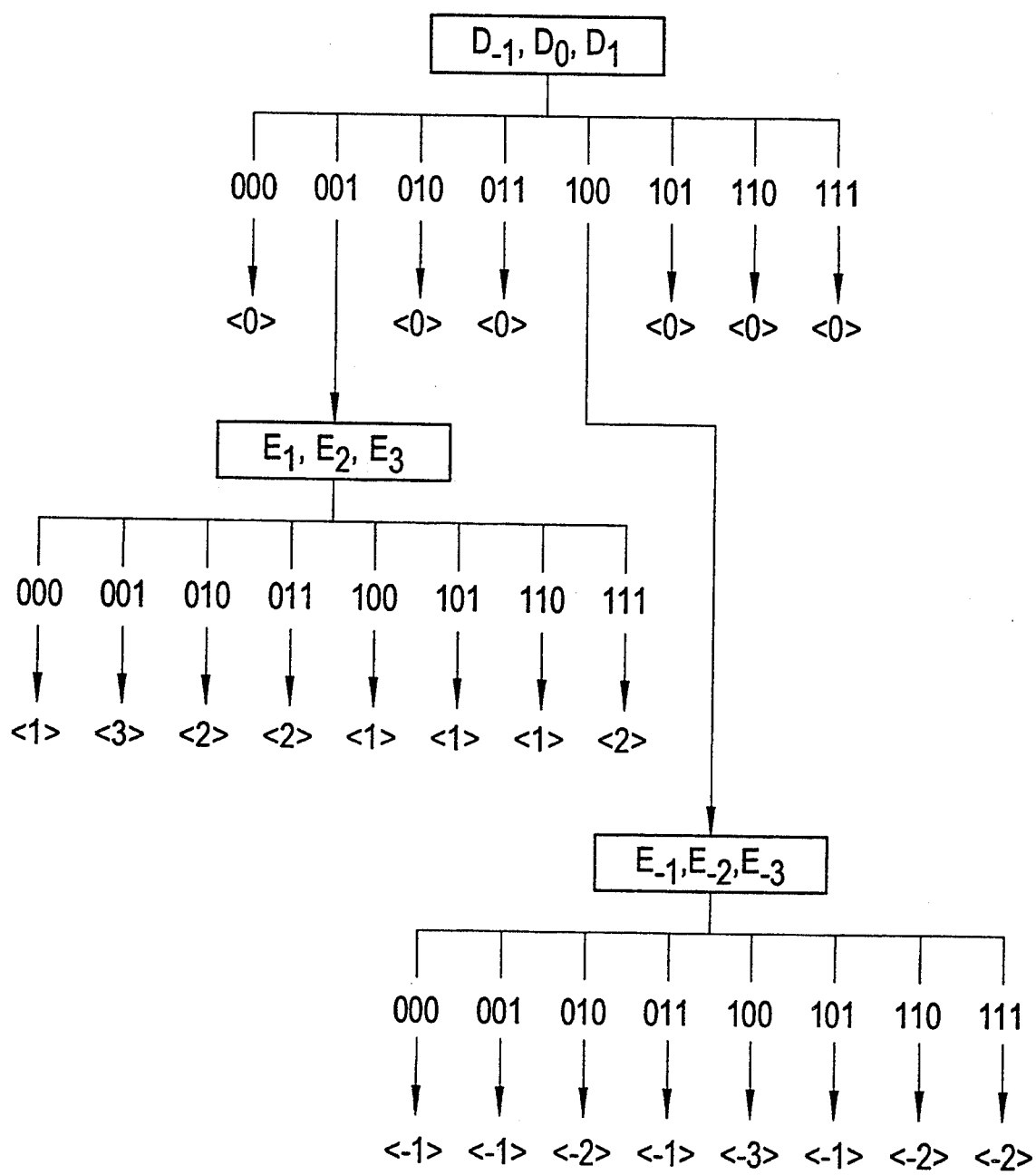
FIG. 10 is a chart used to describe the correlation detection operation of the third embodiment of the invention.

FIG. 10 is a chart showing the characteristics of the determination means 9, specifically showing the cases for determining the interpolation direction from the binary signal ($D(-1)$, $D(0)$, $D(1)$) in the first region obtained with reference value k0, and the binary signals ($E(1)$, $E(2)$, $E(3)$) for the second region and ($E(-3)$, $E(-2)$, $E(-1)$) third region obtained with reference value k1. The codes <number> indicate the interpolation direction.

The determination of the interpolation direction for the binary output ($D(-1)$, $D(0)$, $D(1)$) in the first region is described next.

When the values ($D(-1)$, $D(0)$, $D(1)$) = (0, 0, 0), the pixel level difference exceeds the predetermined reference value k0 in each of the three interpolation directions vertical, 45 degrees right descending, and 45 degrees left descending, and that there is therefore no significant correlation. The vertical interpolation direction $H(0)$ is therefore selected as the interpolation direction. In the case (1,1,1), there is a correlation in all three directions and $H(0)$ is again selected because no meaningful directional relationship can be determined. In the case (1,0,1), there is a correlation in both 45 degrees right and left descending directions, indicating a detection error due to the contradiction, and H(0) is again selected as though there is no correlation. In the case (0,1,0) there is a vertical correlation, and H(0) is selected. In the case (0,0,1) the pixel level difference in the left descending direction exceeds the reference value k0, and a high correlation can be assumed in the direction H(1) in this region, but because there is the possibility that the direction in which interpolation should actually be applied is at a smaller angle to the left descending direction, the final interpolation direction is determined with consideration given to (E(1), E(2), E(3)) in the second region.

Furthermore, there is no contradiction with respect to the correlation for the cases (0,1,1) and (1,1,0) and these cases could be handled in the same way as cases (0,0,1) and (1,0,0) to improve interpolation performance, but they are handled in the present embodiment in the same way as the case (0,1,0) and interpolation direction H(0) is selected because the interpolation direction is shown to be between vertical and 45 degrees.

Evaluation of the interpolation direction based on the state of the signal (E(1), E(2), E(3)) in the second region is described next.

Because the reference value k1 used to determine a correlation in the second region is less than k0 (k1<k0), the value of E(1) will not necessarily be 1 even though (D(−1), D(0), D(1))=(0, 0, 1). There are thus eight possible combinations as shown in FIG. 10.

When the values (E(1), E(2), E(3))=(0, 0, 0) at reference value k1, there is no significant correlation in any of the three directions and the previous evaluation result H(1) is selected. When (1,0,1), there is a contradiction in the correlation detection and H(1) is selected as though there is no correlation.

However, in the case (1,1,1), there is a correlation in all three directions and no meaningful directional relationship can be determined, but H(2) is selected in conjunction with the previous determination.

In the cases (0,0,1), (0,1,0), and (1,0,0) a meaningful directional relationship can be determined and the result of the present evaluation is therefore given precedence to select H(3), H(2), or H(1).

While there is no contradiction in the cases (0,1,1) and (1,1,0) and these cases can be handled in the same way as cases (0,0,1) and (0,1,0), these cases indicate that the direction of correlation is between two of the seven interpolation lines. To reduce interpolation errors, these cases are assumed to be closer to the vertical, and H(2) and H(1) are therefore selected as with cases (0,1,0) and (1,0,0).

Evaluation of the interpolation direction based on the state of the signal (E(−3), E(−2), E(−1)) in the third region is described next.

Because the reference value k1 used to determine a correlation in the second region is less than k0 (k1<k0), the value of E(−1) will not necessarily be 1 even though (D(−1), D(0), D(1))=(1, 0, 0). There are thus eight possible combinations as shown in FIG. 10.

When the values (E(−3), E(−2), E(−1))=(0, 0, 0) at reference value k1, there is no significant correlation in any of the three directions and the previous evaluation result H(−1) is selected. When (1,0,1), there is a contradiction in the correlation detection and H(−1) is selected as though there is no correlation.

However, in the case (1,1,1), there is a correlation in all three directions and no meaningful directional relationship can be determined, but H(−2) is selected in conjunction with the previous determination.

In the cases (0,0,1), (0,1,0), and (1,0,0) a meaningful directional relationship can be determined and the result of the present evaluation is therefore given precedence to select H(−1), H(−2), or H(−3).

While there is no contradiction in the cases (0,1,1) and (1,1,0) and these cases can be handled in the same way as cases (0,1,0) and (1,0,0), these cases indicate that the direction of correlation is between two of the seven interpolation lines. To reduce interpolation errors, these cases are assumed to be closer to the vertical, and H(−1) and H(−2) are therefore selected as with cases (0,0,1) and (0,1,0).

Figure 11:
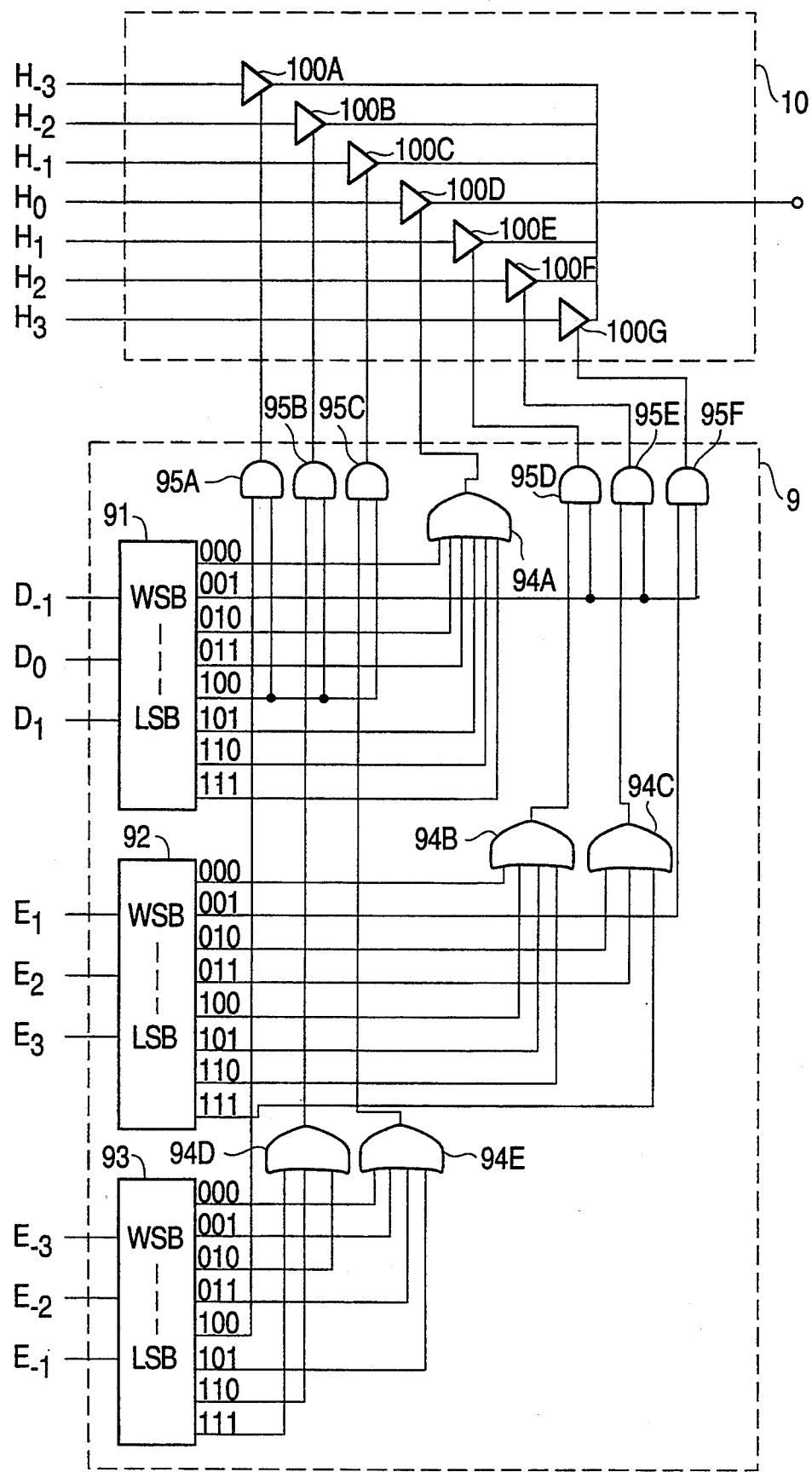
FIG. 11 is a detailed circuit diagram of the determination means and the selection means of the correlation detection interpolation apparatus according to the third embodiment of the invention.
Figure 12:
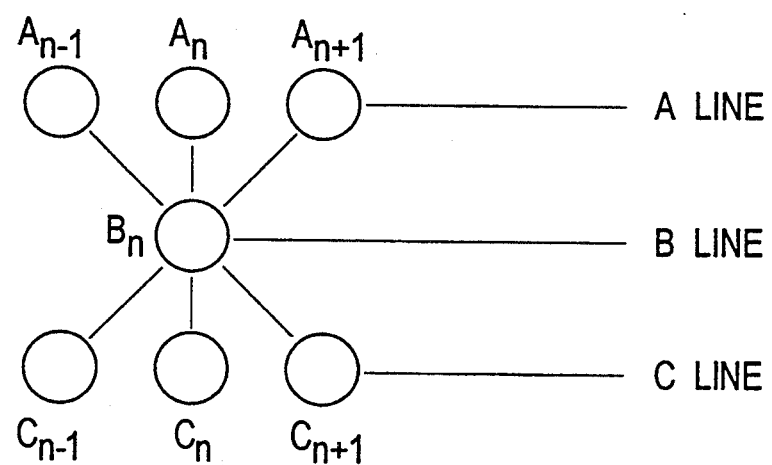
FIG. 12 is an illustration used to describe the conventional interpolation method with correlation detection.
Figure 13:
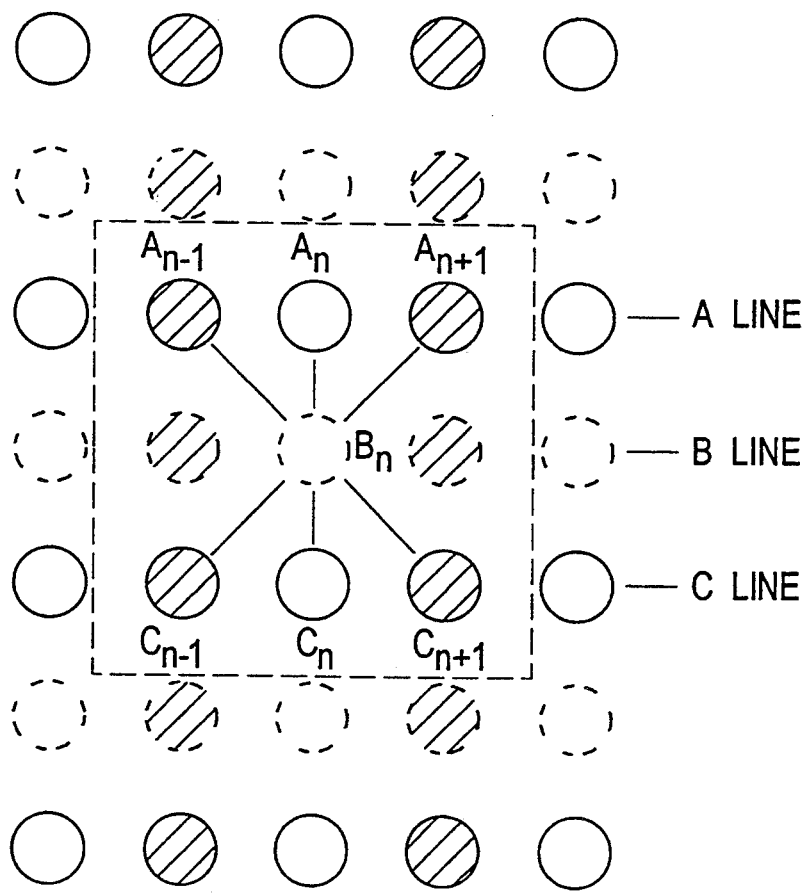
FIG. 13 is an illustration of an image with which the conventional interpolation method results in interpolation noise.

The operation of the circuit shown in FIG. 11 that achieves the above characteristics is described next.

The (D(−1), D(0), D(1)) signal from the absolute value comparison means 7B is decoded by the binary decoder 91, and the (E(1), E(2), E(3)) and (E(−3), E(−2), E(−1)) signals from the absolute value comparison means 7A and 7C, respectively, are decoded by decoders 92 and 93, respectively.

The AND gates 95A–95C apply the evaluation result returned by the decoder 93 and the OR gates 94D and 94E to the selection means 10 only when the binary decoder 91 outputs (1,0,0). AND gates 95D–95F apply the evaluation result returned by the decoder 92 and the OR gates 94B and 94C to the selection means 10 only when the binary decoder 91 outputs (0,0,1). When the decoder outputs any other value, the evaluation result returned by the decoder 91 and the OR gates 94A is applied to the selection means 10. The output of the determination means 9 is applied to the corresponding analog switch 100A–100G in the selection means 10, and the interpolation value for the corresponding interpolation line is output from the interpolation output terminal.

For example, when (D(−1), D(0), D(1)) is (1,0,0), the binary decoder 91 output (1,0,0) becomes active, thus making the AND gates 95A, 95B, and 95C active. If (E(−3), E(−2), E(−1)) is (1,1,0) at this time, OR gate 94D becomes active, the (E(−3), E(−2), E(−1)) signal passes through and the analog switch 100B becomes active so that the interpolation value H(−2) is output to the image output terminal.

To summarize the present embodiment, data for six pixels in the first region is used to detect the pixel level difference for interpolation lines in three directions and passing through the pixel to be interpolated. These differences are compared with a loose reference value k0 to obtain a binary data signal, and the best interpolation line among the three interpolation directions is determined using the combinations of binary data for these three interpolation lines.

Next, if the left descending interpolation direction is selected in the first region, the best interpolation line is determined from among the three interpolation directions using a more restrictive reference value k1 for the six pixels in the second region. If the right descending interpolation direction is selected in the first region, the best interpolation line is determined from among the three interpolation directions using a more restrictive reference value k1 for the six pixels in the third region. Linear interpolation is then applied to the one interpolation line selected from among the interpolation lines in seven directions.

It is to be noted that the above embodiment was described using seven pixels on the above and below scan lines and seven interpolation directions, but five pixels and five interpolation directions can be easily used by setting two interpolation directions in the second and third regions and using a two stage evaluation.

Furthermore, the present invention was described with respect to monochrome data, but the same method can be applied to color signal interpolation by detecting the correlation between the luminance signal or G signal (in an RGB signal image), and interpolating the other signals in the same direction.

Furthermore, the preferred embodiments were described as a hardware implementation of the method, but the same effect can be obtained by applying the same steps by means of software routines.

Effect of the Invention

The present invention is superior to the conventional method of comparing the pixel level differences in each direction in the following ways because the correlation determining the interpolation direction can be separately determined for each interpolation line and the best interpolation direction determined based on all of the resulting combinations as described hereinabove.

It can be definitely determined that there is no correlation in any direction when the pixel level difference is great in all interpolation directions. It is therefore possible to prevent correlation detection errors resulting from this high pixel level difference, and noise and image deterioration resulting from the correlation detection error can be prevented.

Furthermore, when the pixel level difference is low in all interpolation line directions and there is a true correlation in all directions, it is possible to correctly determine that there is a correlation present in all directions. Correlation detection errors resulting from this low pixel level difference can be prevented, and noise and image deterioration resulting from the correlation detection error can be prevented.

In addition, when there is a correlation between plural interpolation lines and there is a contradiction between in the detected correlation, it can be correctly determined that there is no real correlation. Selection of one of the directions even though it should be determined that there is no correlation, and the resulting image deterioration, can be prevented. For example, when the absolute value of the pixel level difference in both the left and right descending directions is less than that in the vertical direction, and the absolute values of the absolute values of the pixel level differences in the left and right descending directions are near, there is a contradiction in the evaluation of correlation, and the present invention can correctly evaluate no correlation and select the vertical interpolation direction.

Furthermore, interpolation errors near the vertical can be reduced because interpolation directions less than 45 degrees to the vertical line can be detected.

Therefore, diagonal lines in the source image can be smoothed and high resolution interpolation can be obtained without introducing noise due to correlation detection errors into the image.

In addition to the above benefits of the first embodiment, the second embodiment of the invention can effectively detect more interpolation directions in the image regardless of the type of image, and can therefore smooth diagonal lines and increase the vertical resolution of the image.

The third embodiment of the invention can further prevent detection errors at small angles where there is a high probability of detection error because correlation data with a high degree of reliability resulting from the use of six pixels near the pxixel to be interpolated is used, and correlation detection is further applied at a small angle less than 45 degrees to the horizontal. Therefore, high precision interpolation can be applied in more directions using fourteen pixels.

Summarizing these benefits, high resolution interpolation free of noise and yielding smooth diagonal lines in the image is possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A correlation detection interpolation apparatus comprising a calculation means for setting plural interpolation lines passing through the pixel to be interpolated at an angle of a maximum ±90 degrees to the vertical, obtaining the arithmetic mean of the pixel level of the two pixels located above and below the pixel to be interpolated on each of the plural interpolation lines, and obtaining the pixel level of the pixel to be interpolated, a correlation value detection means for obtaining a pixel level difference of two pixels located on each of said plural interpolation lines as a correlation value, a setting means for outputting a reference value used to determine whether the correlation indicated by the correlation value output by the correlation value detection means exists, a comparison means for comparing the magnitude of the correlation value output by the correlation value detection means with the reference value, and outputting a binary signal set showing the presence of a correlation in each direction, a determination means for determining the best of the plural interpolation lines using the output set of the comparison means, said determination means determining whether said binary signal set output by the comparison means indicates a correct interpolation direction and, if said binary signal set is correct, identifying the corresponding interpolation line, and if incorrect identifying the vertical interpolation line, and a selection means for selecting and passing the output of the calculation means according to the output of the determination means.

2. The correlation detection interpolation apparatus according to claim 1 in which the setting means comprises a mean value calculation means for calculating an arithmetic mean value over all absolute values of the correlation values output by the correlation detection means for all the interpolation lines and sets the reference value in accordance with the arithmetic mean value calculated by the mean value calculation means.

3. A correlation detection interpolation apparatus comprising a calculation means for setting plural interpolation lines passing through the pixel to be interpolated at an angle of a maximum ±90 degrees to the vertical, obtaining the arithmetic mean of the pixel level of the two pixels located above and below the pixel to be interpolated on each of said plural interpolation lines, and obtaining the pixel level of the pixel to be interpolated, a correlation value detection means for obtaining a pixel level difference of two pixels located on each of said plural interpolation lines as a correlation value, a setting means for outputting first and second reference values used to determine whether the correlation indicated by the correlation value output by the correlation value detection means reflects a high contrast binary image or a low contrast continuous image.

a comparison means for comparing the magnitude of the correlation value output by the correlation value detection means with the first and second reference values, and outputting a binary signal set showing results of the comparison, a determination means for determining the interpolation line using the output signal set of the comparison means, said determination means determining whether said binary signal set output by the comparison means indicates a correct interpolation direction and, if said binary signal set is correct, identifying the corresponding interpolation line, and if incorrect identifying the vertical interpolation line, and a selection means for selecting and passing the output of the calculation means according to the output of the determination means.

4. A correlation detection interpolation apparatus according to claims 1 or 3 which sets plural interpolation lines passing through the pixel to be interpolated at an angle of a maximum ±90 degrees to the vertical, sets a virtual pixel between adjacent pixels within the range of at least one pixel on each side of the pixels directly above and directly below the pixel to be interpolated, respectively, and defines the arithmetic mean of the pixel levels of the two adjacent pixels as the pixel level of the virtual pixel, and increments the angles of the interpolation lines near the vertical in smaller steps using the virtual pixel.

5. The correlation detection interpolation apparatus according to claim 3 wherein the setting means comprises a mean value calculation means for calculating an arithmetic mean value over all absolute values of the correlation values output by the correlation detection means for all the interpolation lines and sets first and second reference values in accordance with the arithmetic mean value calculated by the mean value calculation means.

6. A correlation detection interpolation apparatus according to claims 3 or 5 which sets plural interpolation lines passing through the pixel to be interpolated at an angle of a maximum ±90 degrees to the vertical, sets a virtual pixel between adjacent pixels within the range of at least one pixel on each side of the pixels directly above and directly below the pixel to be interpolated, respectively, and defines the arithmetic mean of the pixel levels of the two adjacent pixels as the pixel level of the virtual pixel, and increments the angles of the interpolation lines near the vertical in smaller steps using the virtual pixel.

7. A correlation detection interpolation method for interpolating a pixel defined as B(0) using the seven pixels A(−3), A(−2), A(−1), A(0), A(+1), A(+2), A(+3) above and the seven pixels C(−3), C(−2), C(−1), C(0), C(+1), C(+2), C(+3) below where A(0) and C(0) are the pixels directly above and directly below pixel B(0), respectively, by grouping the pixel pairs A(−3) and C(3), A(−2) and C(2), A(−1) and C(1), A(0) and C(0), A(1) and C(−1), A(2) and C(−2), and A(3) and C(−3) on the seven interpolation lines passing through pixel B(0) into a first region of three interpolation lines A(−1) and C(1), A(0) and C(0), A(1) and C(−1), a second region of the three interpolation lines A(1) and C(−1), A(2) and C(−2), and A(3) and C(−3), and a third region of the three interpolation lines A(−3) and C(3), A(−2) and C(2), A(−1) and C(1), and determining the interpolated value of the pixel B(0) by applying a step for comparing the difference between levels of two pixels located on each interpolation line in the first region with a predetermined reference value to detect whether a correlation exists, a step for similarly detecting the existance of a correlation in the three interpolation lines of the second region when there is a correlation in the left descending direction (A(1) →C(−1)) in the first region, by applying a step of comparing the difference between levels of two pixels located on each interpolation line in the second region with a predetermined reference value, and defining the arithmetic mean of the two pixel levels as the value of B(0) for the interpolation line about which a correlation is detected, and defining the arithmetic mean of the pixel level in the direction A(1)→C(−1) 1)) as the value of B(0) when there is a contradiction among correlation results obtained by this step, a step for similarly detecting the existence of a correlation in the three interpolation lines of the third region when there is a correlation in the right descending direction (A(−1)→C(1)) in the first region, by applying a step of comparing the difference between levels of two pixels located on each interpolation line in the third region with a predetermined reference value, and defining the arithmetic mean of the two pixel levels as the value of B(0) for the interpolation line about which a correlation is detected, and defining the arithmetic mean of the pixel level in the direction A(−1)→C(1) as the value of B(0) when there is a contradiction among correlation results obtained by this step, and a step for defining the arithmetic mean of the pixel level in the direction A(0)→C(0) as the value of B(0) when any finding other than the above is detected in the first region.

8. The correlation detection interpolation method according to claim 7 wherein the reference value used in the step for detecting the presence of a correlation in the first region is greater in magnitude than the reference value used in the steps for detecting the presence of a correlation in the second and third regions.

9. The correlation detection interpolation method according to claim 7 wherein the reference value is varied in accordance with an arithmetic mean value calculated over all correlation values obtained for all interpolation lines.

10. A correlation detection interpolation apparatus which defines the pixel to be interpolated as B(0), uses the seven pixels A(−3), A(−2), A(−1), A(0), A(+1), A(+2), A(+3) above and the seven pixels C(−3), C(−2), C(−1), C(0), C(+1), C(+2), C(+3) below where A(0) and C(0) are the pixels directly above and directly below pixel B(0), respectively, means for grouping the pixel pairs A(−3) and C(3), A(−2) and C(2), A(−1) and C(1), A(0) and C(0), A(1) and C(−1), A(2) and C(−2), and A(3) and C(−3) on the seven interpolation lines passing through pixel B(0) into a first region of the three interpolation lines A(−1) and C(1), A(0) and C(0), A(1) and C(−1), a second region of the three interpolation lines A(1) and C(−1), A(2) and C(−2), and A(3) and C(−3), and a third region of the three interpolation lines A(−3) and C(3), A(−2) and C(2), A(−1) and C(1), and determines the interpolation value of the pixel B(0) by means of a calculation means for obtaining the arithmetic mean of levels of two pixels located on each of the seven different interpolation lines to obtain the possible pixel levels of the pixel to be interpolated B(0), a correlation value detection means for obtaining a difference between levels of two pixels located on each of the seven interpolation lines and detecting a correlation value, a setting means for outputting a reference value used to determine whether the correlation indicated by the correlation value output by the correlation value detection means exists, a comparison means for comparing the magnitude of each of the correlation values for the seven interpolation lines output by the correlation value detection means with the reference value set by the setting means to determine whether or not a correlation exists in each of seven interpolation directions indicated by the seven interpolation lines and for outputting a first to third set of binary signals representative of the first and third regions, respectively, indicating results of the determination for three interpolation directions in each of the first to third regions, respectively, a determination means for determining an interpolation direction in which a correlation operation is to be performed among the seven interpolation directions based on the set of binary signals output by the comparison means, said determination means determining whether said binary signal set output by the comparison means indicates a correct interpolation direction and, if said binary signal set is correct, identifying the corresponding interpolation line, and if incorrect identifying the vertical interpolation line, and a selection means connected to the output of the calculation means for passing the arithmetic mean of levels of two pixels located in the interpolation direction determined by the determination means, and the determination means includes a first, a second and a third decoding circuit for decoding the first, second and third set of binary signals output by the comparison means and determines the interpolation direction based on the output of the second decoding circuit when the output of the first decoding circuit indicates the presence of a correlation in a direction indicated by A(1)→C(−1) interpolation line, the output of the third decoding circuit when the output of the first decoding circuit indicates the presence of a correlation in a direction indicated by A(−1)→C(1) interpolation line, and the output of the first decoding circuit when neither the A(1)→C(−1) or A(−1)→C(1) interpolation lines are outputted by the first decoding circuit.

11. The correlation detection interpolation apparatus according to claim 10 wherein the setting means outputs first and second reference values which reflect a high contrast binary image or a low contrast continuous image, respectively, and the comparison means compares each of the correlation values obtained in the first region with the second reference value and each of the correlation values obtained in the second and third regions with the first reference value.

12. The correlation detection interpolation apparatus according to claim 10 in which the setting means comprises a mean value calculation means for calculating an arithmetic mean value over all absolute values of the correlation values for each interpolation line output by the correlation detection means and sets the reference value in accordance with the arithmetic mean value calculated by the mean value calculation means.

* * * * *